United States Patent [19]

Petersen

[11] Patent Number: 4,668,141
[45] Date of Patent: May 26, 1987

[54] MULTIPLE POSITION SUPPORT STRUCTURE FOR TRANSPORTING VEHICLES

[76] Inventor: Karl D. Petersen, 11441 E. 14 Mile Rd., Sterling Heights, Mich. 48077

[21] Appl. No.: 759,691

[22] Filed: Jul. 29, 1985

[51] Int. Cl.⁴ ............................ B60P 3/08; B61D 3/18
[52] U.S. Cl. ................................. 410/12; 105/382; 296/43; 410/13; 410/16; 410/24
[58] Field of Search ............................ 410/2, 3, 7–13, 410/16, 18, 24, 24.1, 25–27, 28.1, 150, 4; 296/36, 43; 105/380, 382, 385, 387, 390; 403/387, 395, 399; 248/228, 231.5, 74.1, 75, 104–106, 126, 130

[56] References Cited

U.S. PATENT DOCUMENTS

| | | | |
|---|---|---|---|
| 893,165 | 7/1908 | Haley | 105/390 |
| 1,000,389 | 8/1911 | Ette | 248/228 |
| 1,697,807 | 1/1929 | Blackmore et al. | |
| 1,901,103 | 3/1933 | Judd | 410/24 |
| 2,655,874 | 10/1953 | Swann | 410/106 |
| 2,730,400 | 1/1956 | Francis | 296/1 A |
| 2,763,931 | 9/1956 | McMillan | 248/228 |
| 2,834,631 | 5/1958 | Taraldsen | 296/1 A |
| 2,838,338 | 6/1958 | Kerley et al. | 410/28.1 |
| 3,334,940 | 8/1967 | Demos | 410/24.1 |
| 3,601,349 | 8/1971 | Murphy, Jr. | 410/104 |
| 3,611,949 | 10/1971 | Peismer | 410/10 |
| 3,869,991 | 3/1975 | Robinson | 410/25 |
| 4,072,257 | 2/1978 | Hall | 410/3 |
| 4,227,734 | 10/1980 | Cottrell et al. | 410/12 |
| 4,273,484 | 6/1981 | Blanar | 410/12 |
| 4,343,401 | 8/1982 | Paulyson | 410/11 |
| 4,541,155 | 9/1985 | Gagnon | 248/228 |

FOREIGN PATENT DOCUMENTS

| | | | |
|---|---|---|---|
| 2405840 | 6/1979 | France | 296/43 |
| 7800935 | 8/1979 | Sweden | 296/43 |

Primary Examiner—Randolph A. Reese
Attorney, Agent, or Firm—Gifford, Groh, VanOphem, Sheridan, Sprinkle and Dolgorukov

[57] ABSTRACT

A structure for supporting motor vehicles which can be mounted at various positions along the bed of a transport vehicle to accommodate vehicle and vehicle chassis of different lengths and sizes. The structure generally comprises a dismountable channel member which retains a support post in an upright position and can be secured to the truck bed at different locations. Slidably attached to the upper portion of the support post is an arm which extends outwardly from the post. Similarly, a platform which supports one wheel of the vehicle being transported is removably secured to the arm of the structure. All the components may be lockingly engaged during transport and the structure may be disassembled and stored within the bed of the transport vehicle. Furthermore, all of the components are adjustable relative to one another and the bed of the truck in order accommodate different vehicles.

23 Claims, 3 Drawing Figures

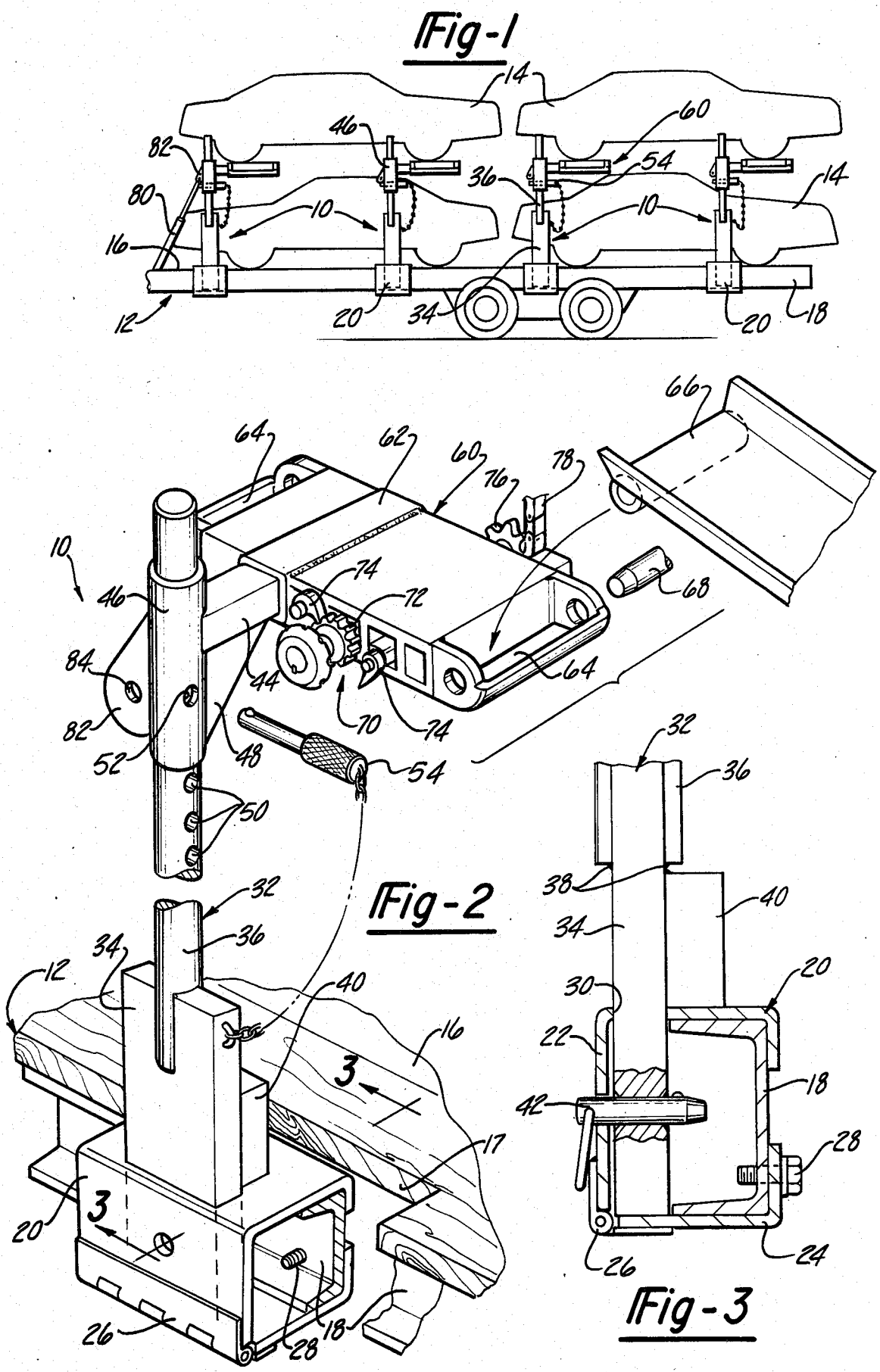

MULTIPLE POSITION SUPPORT STRUCTURE FOR TRANSPORTING VEHICLES

BACKGROUND OF THE INVENTION

I. Field of the Invention

This invention relates to transport vehicles for carrying motor vehicles and vehicle chassis and, in particular, to a dismountable structure for supporting vehicles of different lengths and sizes on a flatbed transport truck.

II. Description of the Prior Art

Semi-trailers have been utilized to transport motor vehicles and vehicle chassis for many years. Fully assembled automobiles or light trucks are transported from the assembly plant to dealer showrooms for sale. Similarly, vehicle chassis may be transported from one manufacturing plant to an assembly plant. Since it is desirable and cost-effective to transport as many vehicles or chassis as possible on each semi-trailer, various means have been developed to increase the load of the transport vehicle while maintaining the limitations for load height, width and weight.

Originally, vehicles were transported on flatbed trucks which were capable of carrying three to four vehicles depending on their size. However, in response to the demand for increased carrying capacity, vehicle structures were developed wherein two sets or levels of automobiles could be transported. These structures generally rely on ramped supports to load and carry the vehicles. However, because these structures are permanently built into the flatbed of the semi-trailer, they are limited as to the size and type of vehicle that may be transported. Moreover, the two-tiered hauler cannot be used with truck and van chassis which have a greater length and height.

In order to accomodate truck and van chassis, a saddleback arrangement was developed to transport these vehicles. In this arrangement, the front end of each chassis overlaps the back end of the previously loaded chassis. The front end of the chassis is supported on loading ramps which are placed on top of the front vehicle. Thus, since each vehicle supports the vehicle directly behind it, the risk of damage to the chassis is increased. Moreover, because a flatbed trailer must be utilized, the cost-effectiveness of transporting other types of vehicles is reduced. This is particularly true when vehicle chassis are transported between two locations on a flatbed trailer and a load of automobiles must be transported on the return trip.

To provide for conversion from the flatbed trailer to a structure capable of transporting several automobiles, a dismountable superstructure was developed as described in U.S. Pat. No. 2,838,338. This structure permitted the conversion of a flatbed trailer into a two-tiered vehicle transport. The structure generally includes a support post which carries a platform upon which the vehicle tire rests. During loading of the flatbed the support post and its platform may be rotated out of position to allow free passage of the vehicles onto the flatbed. Thereafter, the upper tier is loaded using ramps to connect the support platforms. Although useful in transporting automobiles, the superstructure is limited to vehicles of one size since the position of the platforms cannot be varied. Moreover, the structure cannot be used to transport vehicle chassis in a saddleback formation because of the fixed position of the platforms. Thus, although useful in diversifying the uses for a flatbed semi-trailer, the previously known devices fall short in providing the necessary capabilities to haul the wide variety of motor vehicles which require transport from one location to another.

SUMMARY OF THE PRESENT INVENTION

The present invention overcomes the disadvantages of the prior art by providing a structure which can be mounted to the flatbed of a semi-trailer at multiple positions in order to transport motor vehicles and vehicle chassis of various sizes.

The superstructure according to the present invention comprises independent support structures which are utilized in pairs on opposite sides of the truck bed to support at least a portion of the motor vehicle or chassis in an elevated position. The structure generally comprises a channel member which dismountably secures the structure to the bed of the transport vehicle, an upright support post retained within an opening formed in the top of the channel member, an outwardly extending arm adjustably secured to the support post and a platform for supporting a vehicle wheel which is dismountably attached to the outwardly extending arm. The positions of each of these components can be adjusted relative to each other and the bed of the truck to accomodate different size vehicles and chassis. Moreover, once in the proper position, each component may be locked into place to prevent disengagement during transport.

Since the present invention is designed to be utilized in conjunction with a flatbed truck, the structure is rotatable into a non-supporting or loading position. The outwardly extending arm is secured to a sleeve which accepts the support post. Upon removing the locking pin, the arm and platform may be pivoted away from the bed of the truck to allow loading. In addition, the support platform may be rotated downwardly to provide further clearance during loading. Thus, the present invention maximizes efficient loading of the truck bed by permitting one-tier, two-tier or saddleback loading.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a side plan view of the structure of the present invention mounted on the bed of a vehicle utilized to transport automobiles;

FIG. 2 is a detailed perspective of the present invention with portions cutaway for clarity; and FIG. 3 is a cross-sectional view of the mounting structure of the present invention secured to the bed of the transport vehicle taken substantially along line 3—3 of FIG. 2.

DETAILED DESCRIPTION OF A PREFERRED EMBODIMENT OF THE PRESENT INVENTION

Referring generally to FIG. 1, the structure 10 embodying the present invention is thereshown in conjunction with a flatbed semi-trailer 12 utilized to transport motor vehicles, vehicle chassis and the like between various locations. In a preferred embodiment shown in FIG. 1, the structure 10 is utilized to transport a plurality of automobiles 14. However, it is to be understood that the present invention may be utilized to transport motor vehicles of different lengths and sizes in a two-tier system shown in FIG. 1, or vehicle chassis in a saddleback arrangement as will be more fully described hereinafter. Moreover, the structure 10 may be utilized to transport vehicles in different configurations so as to maximize the loading capabilities of the trailer.

As is best shown in FIG. 2, the structure 10 is mounted to the bed 16 of a transport vehicle 12 by securing the structure 10 to a longitudinal beam 18 of the bed 16. Preferably, the bed 16 includes a plurality of slots 17 located at various positions along the bed 16 to facilitate positioning of the structure 10 according to the size of the vehicles and chassis to be transported. The slots 17 permit the structure 10 to be securely attached to the beam 18. Moreover, since the structures 10 are deployed in pairs on opposite sides of the trailer 12 in order to support at least one axle of the vehicle 14, the slots 17 will be identically positioned along both sides of the bed 16.

Referring now to FIGS. 2 and 3, the structure 10 is mounted to the bed 16 of the truck by a channel member 20. The channel member 20 has a substantially C-shaped cross-section which permits the channel member 20 to "grasp" the longitudinal beam 18. The channel member 20 includes an upper portion 22 and a lower portion 24 which are connected by a hinge 26. The lower or hinged portion 24 allows the channel member 20 to be placed around the beam 18 as shown in FIG. 3. A bolt 28 or similar locking device is utilized to secure the channel member 20 to the beam 18.

The channel member 20 is provided with a top opening 30 which slidably receives a support post 32 therethrough. The support post 32, which is retained in a substantially upright position, includes a lower post section 34 and an upper post section 36 which are permanently secured to one another by welds 38 or similar means. In the preferred embodiment, the lower post section 34 has a non-circular cross-section and the upper post section 36 has a circular cross-section. In addition, the lower post section 34 conforms to the top opening 30 of the channel member 20 so that the lower post section will extend through the opening 30 and abut against the lower or hinged portion 24 of the channel member 20. To provide added stability and support to the post 32, an additional block 40 is secured to the lower post section 34 to limit the lateral movement of "sway" of the post 32. The block 40 is secured or formed on the inner surface of the lower post section 34 so that it will abut against and be supported by the upper surface of the channel member 20 and the longitudinal beam 18 of the truck bed 16. In this position, any tendency for the support post 32 to sag towards the center of the bed 16 due to the weight of the vehicles, will be prevented by the block 40. Additionally, a locking pin 42 is provided to lockingly secure the support post 32 within the channel member 20.

Referring now to FIG. 2, a horizontally extending arm 44 having a sleeve portion 46 is secured to the upper post section 36 of the support post 32. The rigid arm 44 is secured to the outer surface of the sleeve portion 46 perpendicular to both the sleeve 46 and the support post 32. A support flange 48 extends between the sleeve 46 and the arm 44 to provide additional support.

In the preferred embodiment, the sleeve 46 has a circular cross-section which conforms to the shape of the upper post section 36. Alternatively, both the post and the sleeve may be any shape which allows the upper post section 36 to extend through the sleeve portion 46 of the support arm 44. However, by employing a circular cross-section for both the post and sleeve, the arm 44 may be rotated to a loading position as will be hereinafter described. In addition, both the sleeve 46 and the post 36 include at least one throughbore which allows the arm 44 to be selectively positioned at different heights relative to the bed 16. As is shown in FIG. 2, the upper post section 36 includes a series of vertically aligned throughbores 50 while the sleeve 46 includes one throughbore 52. By aligning the bore 52 with one of the throughbores 50, the height of the arm 44 may be adjusted. Once the desired height is determined, the locking pin 54 is placed through the openings to secure the arm in the proper position.

Referring still to FIG. 2, a support platform 60 is dismountably attached to the rigid arm 44. The platform 60 includes a sleeve 62 which extends across the platform 60 and slidably accepts the arm 44 therethrough. The sleeve 62 has a cross-section identical to the cross-section of the arm 44 both of which are non-circular in order to prevent rotation of the platform 60. Thus, the platform 60 is retained in a horizontal position above the bed 16 by the arm 44 and support post 32 but may be easily removed during loading.

The platform 60 also includes troughs 64 which accept the ends of loading ramps 66 as is best shown in FIG. 2. The ramps 66 are of a conventional type utilized throughout the industry and include locking bars 68 which prevent the ramps 66 from disconnecting from the support platform 60. Alternatively, the ramps 66 may be secured to pairs of support platforms 60 such that they extend between the platforms 60 thereby forming a continuous support which is useful during two-tier transport of vehicles as will be hereinafter described.

Also included in the platform 60 is a ratchet and pawl assembly 70 for securing the motor vehicle 14 to the platform 60. The assembly 70 includes the ratchet gear 72 and two pawls 74 one of which engages the gear 72 depending upon the position of the platform 60. Secured to the opposite end of a common hub which extends through the platform 60 is a gear 76 and a securement chain 78. As is conventional with transport vehicles, the chain 78 is secured to the frame of the vehicle 14 and thereafter tightened by rotating the gear 76 utilizing the ratchet and pawl assembly 70.

Use of the present invention provides economical and convenient transport of motor vehicles or vehicle chassis by truck between various locations. Since not all vehicle chassis are alike, vehicles of different sizes are transported by different trucks configured to store a particular size vehicle. This can result in increased transportation costs because the transport vehicles are able to economically move vehicles in only one direction. The present invention allows smaller vehicles, such as automobiles, to be transported in one direction, and larger vehicles, such as truck or van chassis, to be transported back to the original starting point. The support structure 10 allows transport of the automobiles in a two-tier arrangement and the truck chassis in a saddleback arrangement wherein the front portion of each vehicle is supported above the truck bed and over the rear portion of the vehicle directly in front of it.

In order to utilize the support structure 10, the proper positioning of each structure 10 must be determined. Once the desired position is found, the channel member 20 is secured to the trailer 12 by placing the upper portion 22 of the channel member 20 through the slot 17 in the bed 16. Thereafter, the lower hinged portion 24 is secured to the underside of the bed 16 such that the channel member 20 encompasses the longitudinal beam 18 of the trailer 12. Bolt 28 is properly positioned to secure the channel member 20 to the beam 18.

The upright support post 32 is placed within the top opening 30 of the channel member 20 such that lower post section 34 extends through the opening 30 and abuts against the lower portion of the channel member. In this position the block 40 abuts against the top of the channel member 20. To secure the support post 32 within the channel member 20, the locking pin 42 is placed through the now aligned holes in the channel member 20 and the lower post section 34.

Upon properly positioning and securing the support post 32, arm 44 and sleeve 46 may be placed over the upper post section 36. In the event the bed 16 is fully loaded, the arm 44 may be positioned such that it extends inwardly towards the center of the trailer 12. Alternatively, the arm 44 may be placed in a loading position (not shown) such that the arm 44 extends parallel to the beam 18 and the side of the trailer 12. In this position, vehicles 14 may be loaded or unloaded from the flatbed without the risk of damage due to interference from the arm 44. In either position, the arm 44 may be locked into place by placing the locking pin 54 through the bores 50 and 52.

Assembly of the structure 10 is completed by attaching the platform 60 to the arm 44. In the preferred embodiment, the arm 44 and the transverse sleeve 62 have a square cross-section which facilitates multiple positioning of the platform 60 with respect to the arm 44. During loading or unloading, the platform 60 may be placed on the arm 44 parallel to the support post 32. By pivoting the arm 44 to its loading position parallel to the beam 18 as discussed above, the bed 16 of the trailer 12 may be loaded while the structure 10 is substantially assembled. Once loading is completed, the structure 10 may be moved to its support position (FIG. 2) by rotating the arm 44 and readjusting the platform 60. In addition, either or both, the arm 44 and the platform 60 may be inverted in relation to support post 32 to increase the positioning capabilities of the structure 10. This inversion of the arm 44 and platform 60 is made possible by the dual pawls 74, at least one of which is in contact with the ratchet gear 72 in either position.

During loading, the ramps 66 are utilized to connect the trailer bed 16 with the support platform 60. Alternatively, the ramps 66 may be connected between platforms 60 to facilitate the two-tier configuration. Additionally, a hydraulic lift 80 may be utilized to vary the height of the platform 60 once the vehicles 14 are loaded or, alternatively, to allow loading or unloading of individual vehicles 14 from the bottom tier when the top tier is loaded. The hydraulic lift 80 extends between the trailer bed 16 and a flange 82 secured to the sleeve portion 46. The flange 82 includes an aperture 84 which accepts the end of the hydraulic lift 80. Thus, the hydraulic lift 80 may be utilized to raise or lower the arm 44 and platform 60 which thereafter may be locked into the proper position using the pin 54.

The present invention therefore provides convenient and economical means for transporting vehicles and vehicle chassis of different sizes using the same flatbed trailer. Additionally, because of the multiple piece construction of the invention, the structure 10 can be readily secured to the bed of a transport trailer with only minor modifications to the trailer bed. Finally, truck or van chassis loaded in a saddleback arrangement are independently secured to the truck bed and therefore are not secured to each other as with conventional loading arrangements thereby preventing damage to the individual chassis and reducing the risk of a shifting load during sudden stops.

The foregoing detailed description has been given for clearness of understanding only and no unnecessary limitations should be understood therefrom as some modifications will be obvious to those skilled in the art without deviating from the spirit of the appended claims.

I claim:

1. In conjunction with a transport vehicle having a substantially flat bed for supporting motor vehicles, a multiple position structure for supporting at least a portion of a motor vehicle in an elevated position, said structure comprising:

a channel member dismountably secured to said bed of the transport vehicle, said channel member having an upper portion pivotally connected to a lower portion, and means for pivotally connecting said upper portion to said lower portion, said upper portion having a top surface having an opening therein and an end portion extending from said top surface for engagement with said bed of the transport vehicle for selective placement of said channel member on the bed of the transport vehicle;

an upright support post slidably received within said opening of said top surface of said channel member, said upright support having a lower post section extending through said opening and abutting said lower portion of said channel member;

a rigid arm having a sleeve portion secured perpendicular thereto, said sleeve portion being adapted to receive said support post;

means for selectively locking said rigid arm and said sleeve portion in one of a plurality of positions relative to said support post wherein said rigid arm extends perpendicular to said upright post; and a support platform for supporting a wheel of the motor vehicle during transport, said platform dismountably attached to said rigid arm.

2. The support structure as defined in claim 1 wherein said channel member has a substantially C-shaped cross-section and wherein said means for pivotally connecting said upper portion to said lower portion comprises a hinged portion for mounting said channel member to the bed of the transport vehicle.

3. The support structure as defined in claim 2 and including means for lockingly securing said channel member to the bed of the transport vehicle.

4. The support structure as defined in claim 1 wherein said upright support post includes an upper section having a circular cross-section and said lower section having a non-circular cross-section wherein said upper post section is permanently secured to said lower post section.

5. The support structure as defined in claim 4 wherein said opening in said top surface of said channel member has the same shape as said lower post section.

6. The support structure as defined in claim 4 wherein said sleeve portion has a circular cross-section and wherein said upper post section slidably extends through said sleeve portion.

7. The support structure as defined in claim 6 wherein said upper post section includes a plurality of vertically aligned throughbores and wherein said sleeve portion includes at least one throughbore.

8. The support structure as defined in claim 7 wherein said means for selectively locking said rigid arm and sleeve portion to said support post comprises a locking pin which extends through one of said at least one throughbore of said sleeve portion and one of said plurality of vertically aligned throughbores thereby locking said rigid arm in a supporting position.

9. The support structure as defined in claim 8 wherein said upper post section further includes at least one secondary throughbore perpendicular to said plurality of vertically aligned throughbores and wherein said sleeve portion and said rigid arm may be locked into a loading position.

10. The support structure as defined in claim 1 wherein said support post further includes means for limiting the lateral movement of said support post.

11. The support structure as defined in claim 1 wherein said rigid arm has a non-circular cross-section.

12. The support structure as defined in claim 11 wherein said support platform includes a transverse sleeve having the same cross-section as said rigid arm and wherein said sleeve slidably accepts said rigid arm therethrough.

13. The support structure as defined in claim 1 wherein said support platform includes means for accepting and lockingly engaging vehicle loading ramps.

14. The support structure as defined in claim 1 and further comprising means for securing the motor vehicle to said support structure, said means comprising a gear and chain assembly secured to a ratchet and at least one pawl wherein said gear and chain assembly and said ratchet are secured by a common hub extending through said support platform.

15. The support structure as defined in claim 1 and further comprising means for hydraulically raising or lowering said rigid arm and support platform.

16. The support structure as defined in claim 15 wherein said sleeve portion includes a flange member having an aperture for accepting one end of a hydraulic lift extending from the bed of the transport vehicle to said aperture.

17. The support structure as defined in claim 1 and further comprising means for locking said support post within said channel member.

18. The support structure as defined in claim 1 wherein the bed of the transport vehicle includes a plurality of longitudinally extending slots for mounting said channel member to the transport vehicle.

19. The support structure as defined in claim 1 wherein at least two support structures are mounted on opposite sides of the transport vehicle bed and wherein each of said at least two support structures supports one wheel of a motor vehicle.

20. In conjunction with a transport vehicle having a substantially flat bed for supporting motor vehicles, a multiple position structure for supporting at least a portion of a motor vehicle in an elevated position, said structure comprising:

a dismountable C-shaped channel member having a lower portion, an upper portion and means for pivotally connecting said lower portion to said upper portion for selectively securing said structure to the bed of the transport vehicle, said channel member having an opening in said top portion thereof;

an upright support post slidably received within said opening of said channel member, said support post comprising a lower post section having a non-circular cross-section and an upper post section having a circular cross-section wherein said lower post section extends through said opening of said channel member and abuts against said lower portion of said channel member;

a rigid arm having a sleeve portion secured perpendicular thereto wherein said sleeve portion has a circular cross-section and receives said upper post section;

means for selectively locking said rigid arm and said sleeve portion in one of a plurality of positions said means including a plurality of throughbores in said upper post section and at least one throughbore in said sleeve portion through which extends a removable locking pin;

a support platform for supporting a wheel of the motor vehicle, said support platform dismountably attached to said rigid arm, said support platform including a transverse sleeve which accepts said rigid arm therethrough; and means for limiting the lateral movement of said support post.

21. The support structure as defined in claim 20 wherein said means for pivotally connecting said lower portion to said upper portion comprises a hinge for mounting said channel member to the bed of the transport vehicle.

22. The support structure as defined in claim 21 and further comprising means for lockingly securing said upper portion and said channel member to the bed of the transport vehicle.

23. The support structure as defined in claim 20 wherein said support platform includes means for accepting vehicle loading ramps and means for securing a motor vehicle to said support structure.

* * * * *